(12) United States Patent
Takehana et al.

(10) Patent No.: US 10,890,238 B2
(45) Date of Patent: Jan. 12, 2021

(54) ROBOT, FLEXIBLE GEAR, GEAR DEVICE, AND MANUFACTURING METHOD OF FLEXIBLE GEAR

(71) Applicant: Seiko Epson Corporation, Tokyo (JP)

(72) Inventors: Nobuyuki Takehana, Matsumoto (JP); Kenji Aoyagi, Shiojiri (JP)

(73) Assignee: Seiko Epson Corporation

( * ) Notice: Subject to any disclaimer, the term of this patent is extended or adjusted under 35 U.S.C. 154(b) by 967 days.

(21) Appl. No.: 15/466,092

(22) Filed: Mar. 22, 2017

(65) Prior Publication Data

US 2017/0276225 A1    Sep. 28, 2017

(30) Foreign Application Priority Data

Mar. 28, 2016  (JP) ................................. 2016-063183

(51) Int. Cl.
*F16H 49/00* (2006.01)
*B25J 9/10* (2006.01)

(52) U.S. Cl.
CPC .......... *F16H 49/001* (2013.01); *B25J 9/1025* (2013.01); *F16H 2049/003* (2013.01); *Y10S 901/25* (2013.01)

(58) Field of Classification Search
CPC ........ F16H 49/001; B25J 9/1025; B21K 1/32; B21D 22/20
USPC ......................................................... 74/640
See application file for complete search history.

(56) References Cited

U.S. PATENT DOCUMENTS

| 2,415,940 | A | * | 2/1947 | Eckstein | ................ B21D 22/20 72/329 |
| 4,817,457 | A | * | 4/1989 | Carlson | ................. F16H 49/001 74/640 |
| 5,634,377 | A |   | 6/1997 | Kimura et al. | |
| 2008/0010828 | A1 |   | 1/2008 | Yamagata et al. | |
| 2015/0240930 | A1 |   | 8/2015 | Kobayashi et al. | |

FOREIGN PATENT DOCUMENTS

| DE | 10-2005-020305 A1 | 11/2006 |
| JP | 07-246579 A | 9/1995 |
| JP | 2004-098112 A | 4/2004 |
| JP | 2008-036710 A | 2/2008 |
| JP | 2008-115932 A | 5/2008 |
| JP | 2011-183444 A | 9/2011 |
| JP | 2015-161346 A | 9/2015 |
| JP | 2016-029877 A | 3/2016 |

OTHER PUBLICATIONS

Extended European Search Report for Application No. EP 17 16 2765 dated Aug. 25, 2017 (10 pages).

* cited by examiner

*Primary Examiner* — William C Joyce
(74) *Attorney, Agent, or Firm* — Harness, Dickey & Pierce, P.L.C.

(57) ABSTRACT

A robot includes a base, a first arm that is provided to be rotatable with respect to the base, and a gear device that transmits a driving force from the base to the first arm. The gear device has a flexible gear. The flexible gear has a cylindrical body portion and a bottom portion that is connected to one end portion of the body portion. The bottom portion has a metal flow radially extending from a center side to an outer peripheral side of the bottom portion.

10 Claims, 14 Drawing Sheets

ROBOT, FLEXIBLE GEAR, GEAR DEVICE, AND MANUFACTURING METHOD OF FLEXIBLE GEAR

BACKGROUND

1. Technical Field

The present invention relates to a robot, a flexible gear, a gear device, and a manufacturing method of a flexible gear.

2. Related Art

In a robot including a robot arm configured to include at least one arm, for example, a joint portion of the robot arm is driven by a motor, and, in general, a driving force from the motor is decelerated by a reduction gear. As such a reduction gear, a wave gear device in which a flexible gear and a rigid gear mesh with each other is known (for example, JP-A-7-246579).

In the wave gear device of the related art, a strength variation in a circumferential direction of the flexible gear is large and there is a concern that the flexible gear is damaged.

SUMMARY

An advantage of some aspects of the invention is to provide a robot capable of reducing damage of a flexible gear, a flexible gear, a gear device, and a manufacturing method of a flexible gear.

The advantage can be achieved by the following configurations.

A robot according to an aspect of the invention includes a first member; a second member that is configured to include an arm and is rotatably provided with respect to the first member; and a gear device that transmits a driving force from one of the first member and the second member to the other. The gear device has a flexible gear. The flexible gear has a cylindrical body portion and a bottom portion that is connected to one end portion of the body portion. The bottom portion has a metal flow extending from a center side to an outer peripheral side of the bottom portion.

In the robot, the bottom portion of the flexible gear has the metal flow extending from the center side to the outer peripheral side of the bottom portion. Therefore, the metal flow extending from a bottom portion side to an opening portion side (side opposite to the bottom portion) of the body portion can be formed over an entire region in a circumferential direction of the body portion. Therefore, a strength variation of the flexible gear in the circumferential direction of the body portion is reduced and, as a result, damage of the flexible gear can be reduced.

In the robot, it is preferable that the metal flow radially extends from the center side to the outer peripheral side of the bottom portion.

With this configuration, the metal flow extending from the bottom portion side to the opening portion side (side opposite to the bottom portion) of the body portion can be formed over the entire region in the circumferential direction of the body portion.

In the robot, it is preferable that the body portion has the metal flow extending from one end portion side to the other end portion side of the body portion.

With this configuration, toughness of the flexible gear in a width direction (radial direction) can be made excellent. In addition, a tensile strength of the flexible gear in an axial direction can also be made excellent.

In the robot, it is preferable that the metal flow included in the body portion extends in a direction intersecting a tooth trace of the flexible gear.

With this configuration, strength of a tooth of the flexible gear can be made excellent.

In the robot, it is preferable that the metal flow included in the body portion has a folded portion when viewed in a cross section along an axis of the body portion.

With this configuration, a density of the metal flow in the body portion can be increased. As a result, a toughness of the body portion can be improved.

In the robot, it is preferable that the metal flow included in the body portion has a direction component along the circumferential direction of the body portion and extends from one end portion side to the other end portion side of the body portion.

With this configuration, the metal flow included in the body portion can extend in a direction intersecting the tooth trace of the flexible gear.

In the robot, it is preferable that the metal flow included in the body portion has a bending portion along a shape of a tooth surface of the flexible gear when viewed in a cross section intersecting an axis of the body portion.

With this configuration, the strength of the tooth of the flexible gear can be made excellent.

In the robot, it is preferable that the metal flow included in the body portion is connected to a metal flow included in the bottom portion.

With this configuration, strength of a portion (boundary portion) between the bottom portion and the body portion of the flexible gear can be made excellent.

In the robot, it is preferable that the metal flow included in the bottom portion curves and extends from the center side to the outer peripheral side of the bottom portion.

With this configuration, in a state where the metal flow included in the body portion is continuously connected to the metal flow included in the bottom portion, the metal flow included in the body portion can have the direction component along the circumferential direction of the body portion and can extend from one end portion side to the other end portion side of the body portion.

A robot according to an aspect of the invention includes a first member; a second member that is configured to include an arm and is rotatably provided with respect to the first member; and a gear device that transmits a driving force from one of the first member and the second member to the other. The gear device has a flexible gear. The flexible gear has a cylindrical body portion and a flange portion that is connected to one end portion of the body portion. The flange portion has a metal flow extending from an inner peripheral side to an outer peripheral side of the flange portion.

In the robot, the flange portion of the flexible gear has the metal flow radially extending from the inner peripheral side to the outer peripheral side thereof. Therefore, the metal flow extending from a flange portion side to an opening portion side (side opposite to the flange portion) of the body portion can be formed over an entire region in the circumferential direction of the body portion. Therefore, a strength variation of the flexible gear in the circumferential direction of the body portion is reduced and, as a result, damage of the flexible gear can be reduced.

A flexible gear according to an aspect of the invention includes a cylindrical body portion; and a bottom portion that is connected to one end portion of the body portion, and the bottom portion has a metal flow radially extending from a center side to an outer peripheral side of the bottom portion.

In the flexible gear, the bottom portion of the flexible gear has the metal flow radially extending from the center side to the outer peripheral side thereof. Therefore, the metal flow extending from a bottom portion side to an opening portion side (side opposite to the bottom portion) of the body portion can be formed over an entire region in the circumferential direction of the body portion. Therefore, a strength variation of the flexible gear in the circumferential direction of the body portion is reduced and, as a result, damage of the flexible gear can be reduced.

A gear device according to an aspect of the invention includes the flexible gear according to the aspect of the invention.

In the gear device, damage of the flexible gear can be reduced.

A manufacturing method of a flexible gear according to an aspect of the invention includes preparing a material composed of metal; forming a plate body by upset-forging the material; and forming a structure body having a cylindrical portion by drawing the plate body.

In the manufacturing method of the flexible gear, the flexible gear of which damage can be reduced can be manufactured.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot, a flexible gear, a gear device, and a manufacturing method of a flexible gear according to the invention will be described in detail with reference to preferable embodiments illustrated in annexed drawings.

1. Robot

First, an embodiment of a robot according to the invention will be described.

Figure 1:
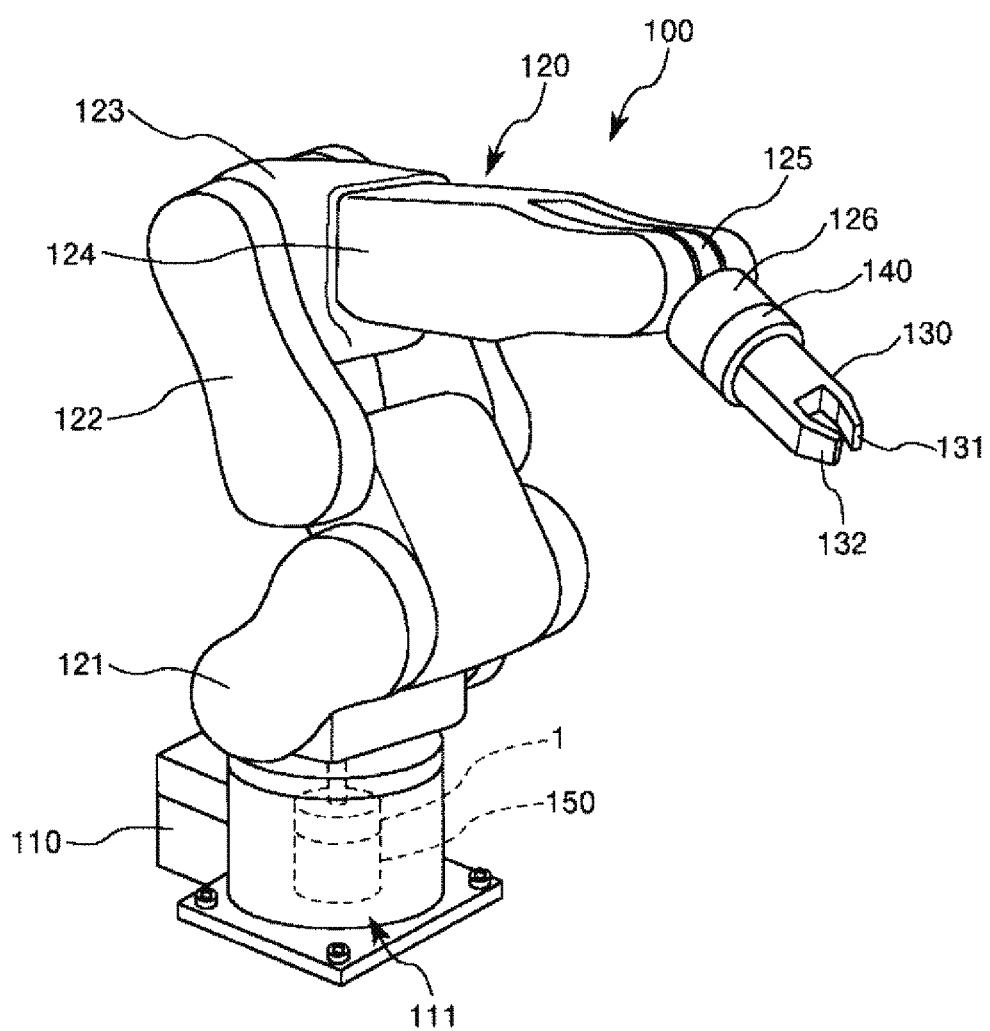
FIG. 1 is a view illustrating a schematic configuration of an embodiment of a robot according to the invention.

FIG. 1 is a view illustrating a schematic configuration of an embodiment of the robot according to the invention.

A robot 100 illustrated in FIG. 1 can perform work such as feeding, removing, conveying, and assembling of a precision apparatus, or materials of components (objects) configuring the precision apparatus.

The robot 100 is a six-axis vertical multi-articulated robot and has a base 111, a robot arm 120 connected to the base 111, a force detector 140, and a hand 130 provided at a distal end of the robot arm 120. In addition, the robot 100 has a control device 110 that controls a plurality of driving sources (including a motor 150 and a gear device 1) that generate power for driving the robot arm 120.

The base 111 is a portion for attaching the robot 100 to an arbitrary installation place. Moreover, the installation place of the base 111 is not particularly limited, and examples thereof include a floor, a wall, a ceiling, a movable carriage, and the like.

The robot arm 120 has a first arm 121 (arm), a second arm 122 (arm), a third arm 123 (arm), a fourth arm 124 (arm), a fifth arm 125 (arm), and a sixth arm 126 (arm) which are connected in this order from a proximal end side to a distal end side. The first arm 121 is connected to the base 111. For example, the hand 130 (end effector) for gripping various components and the like is detachably attached to a distal end of the sixth arm 126. The hand 130 has two fingers 131 and 132, and, for example, various components and the like can be gripped by the fingers 131 and 132.

The base 111 is provided with a driving source having the motor 150 such as a servo motor for driving the first arm 121 and the gear device 1 (reduction gear). In addition, although not illustrated, a plurality of the driving sources having motors and reduction gears are respectively provided in each of the arms 121 to 126. Therefore, each driving source is controlled by the control device 110.

In such a robot 100, the gear device 1 transmits a driving force from one of the base 111 (first member) and the first arm 121 (second member) to the other. More specifically, the gear device 1 transmits a driving force for rotating the first arm 121 with respect to the base 111 from a base 111 side to a first arm 121 side. Here, since the gear device 1 functions as the reduction gear, it is possible to decelerate the driving force and to rotate the first arm 121 with respect to the base 111. Moreover, the "rotation" includes a bidirectional movement including one direction or the opposite direction with respect to a certain center point, and rotation with respect to a certain center point.

In the embodiment, the base 111 is the "first member" and the first arm 121 is the "second member". Moreover, the "second member" may include an arbitrary number of arms selected sequentially from the first arm 121 side among the second to sixth arms 122 to 126. That is, it can be said that a structure composed of the first arm 121 and an arbitrary number of arms selected sequentially from the first arm 121 side among the second to sixth arms 122 to 126 is the "second member". For example, it can be said that the structure composed of the first and second arms 121 and 122 is the "second member", or it can be said that the entire robot arm 120 is the "second member". In addition, the "second member" may include the hand 130. That is, it can be said that a structure composed of the robot arm 120 and the hand 130 is the "second member".

The robot 100 described above includes the gear device 1 which is described below and thereby damage of a flexible gear included in the gear device 1 can be reduced.

2. Gear Device

Hereinafter, an embodiment of the gear device according to the invention will be described.

First Embodiment

Figure 2:
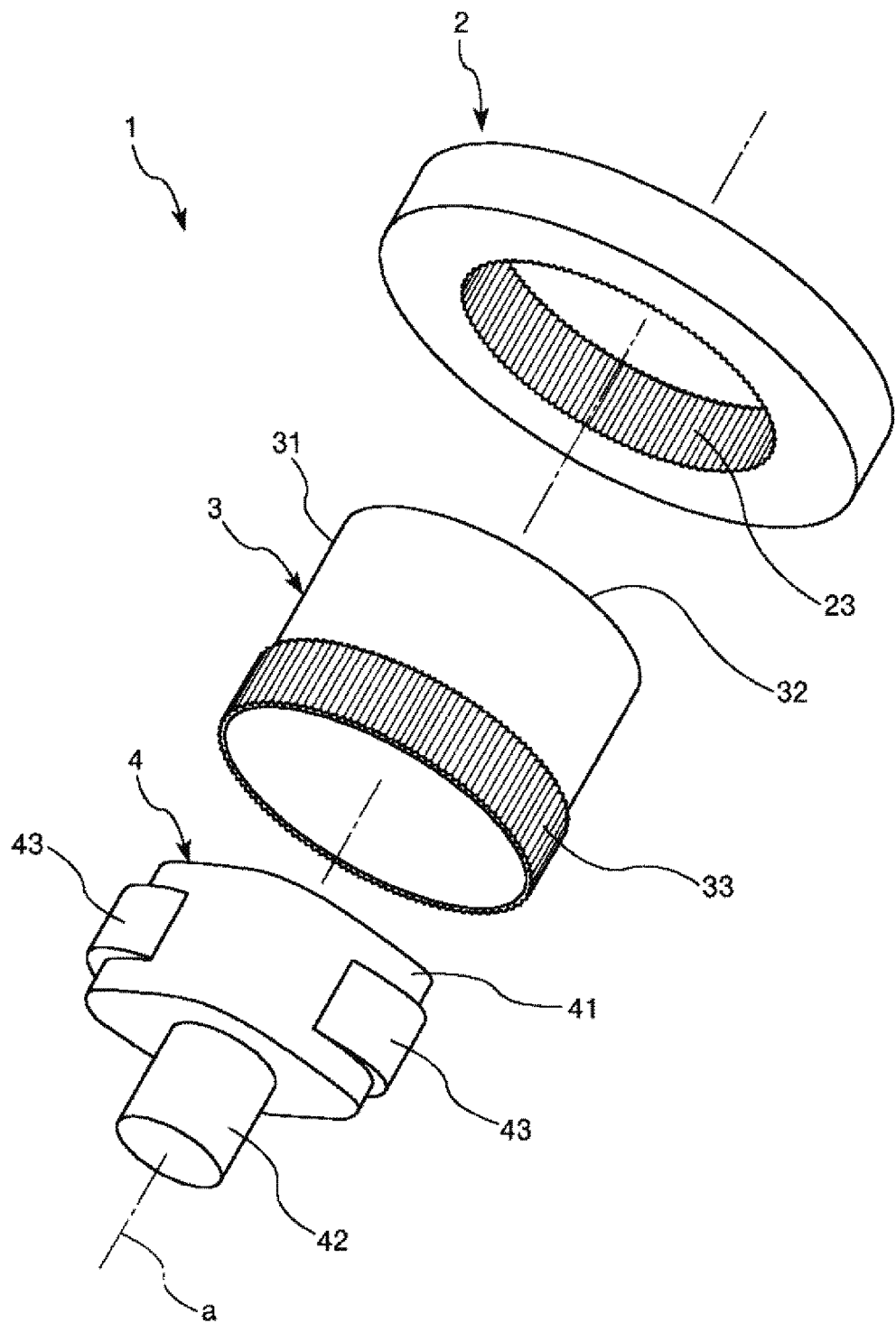
FIG. 2 is an exploded perspective view illustrating a gear device of a first embodiment of the invention.
Figure 3:
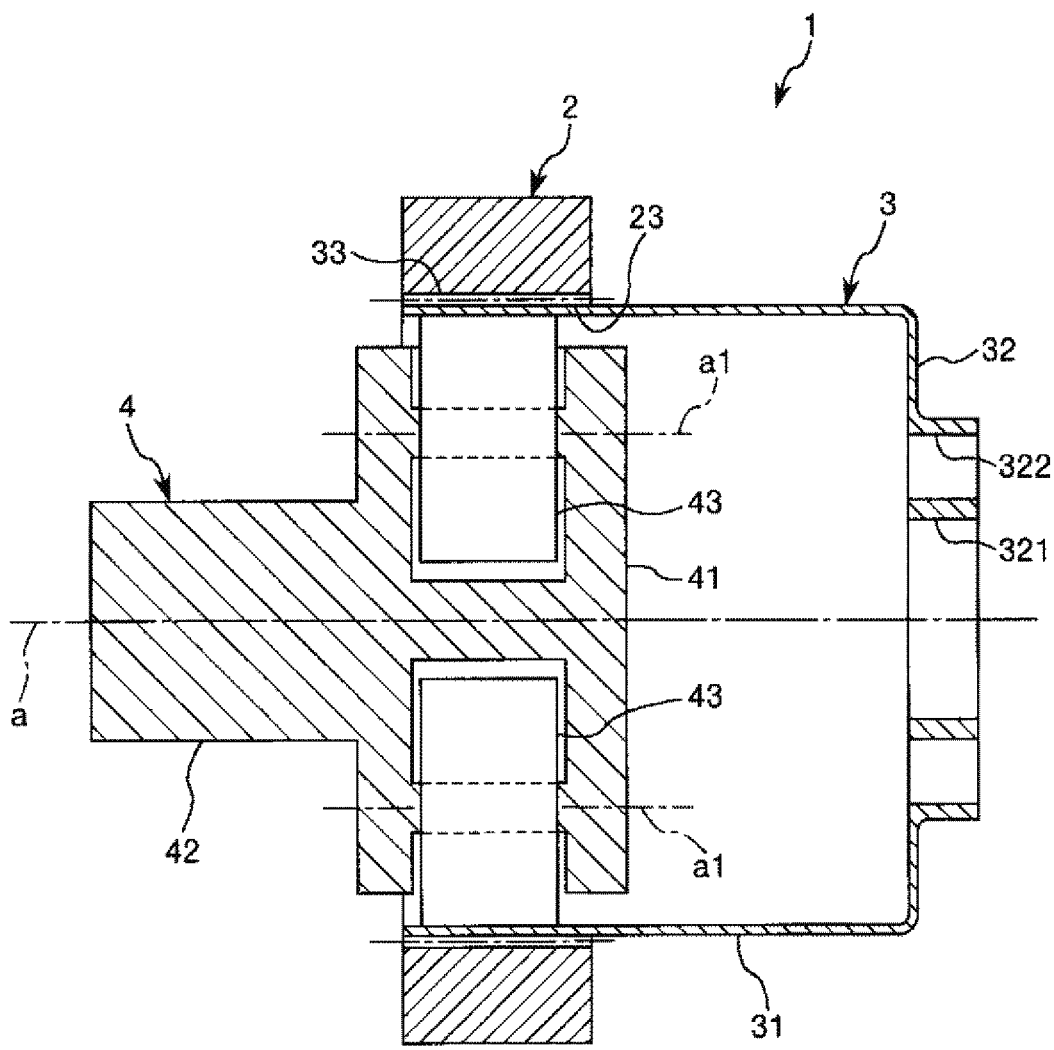
FIG. 3 is a vertical sectional view of the gear device illustrated in FIG. 2.
Figure 4:
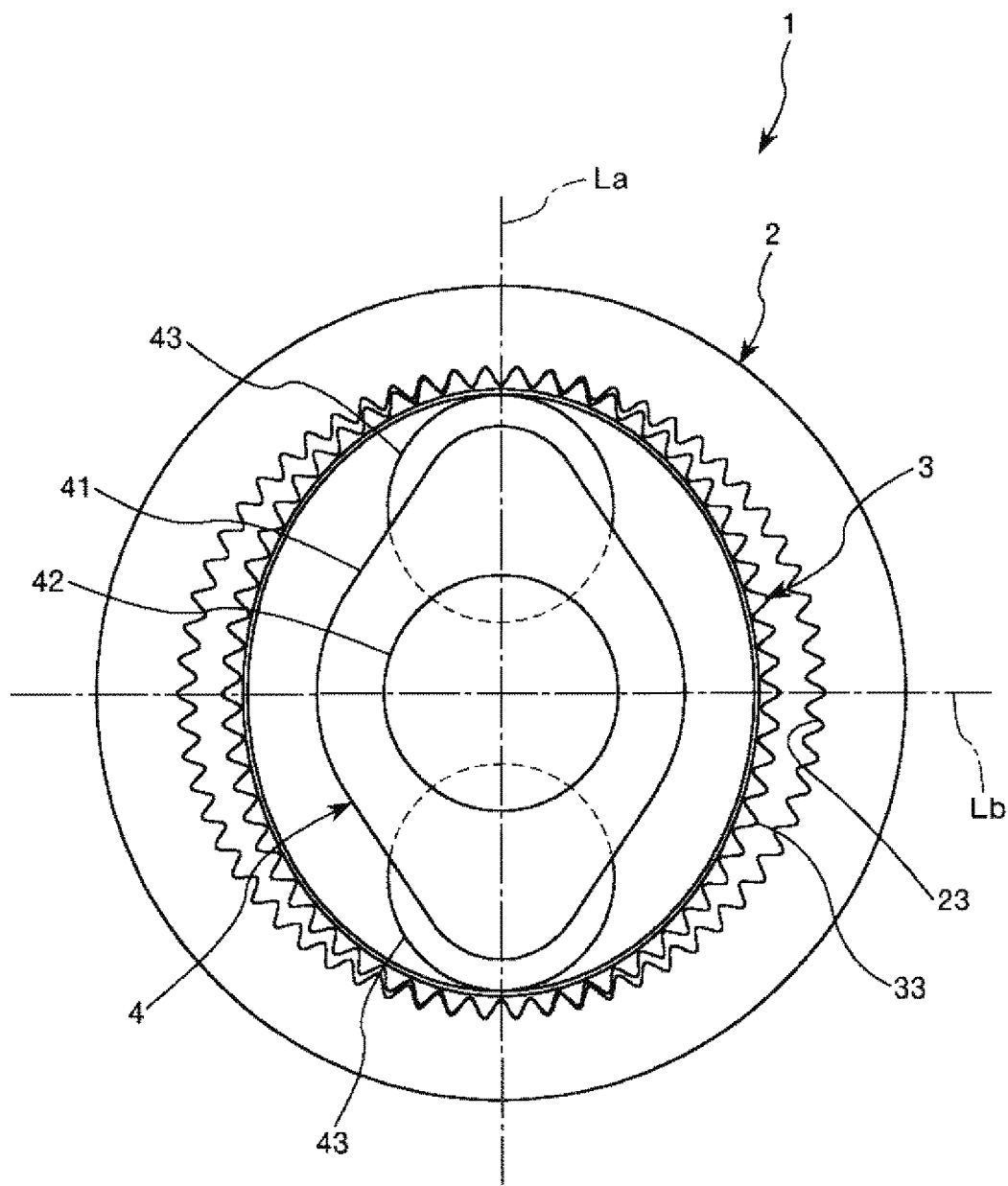
FIG. 4 is a front view of the gear device illustrated in FIG. 2.
Figure 5:
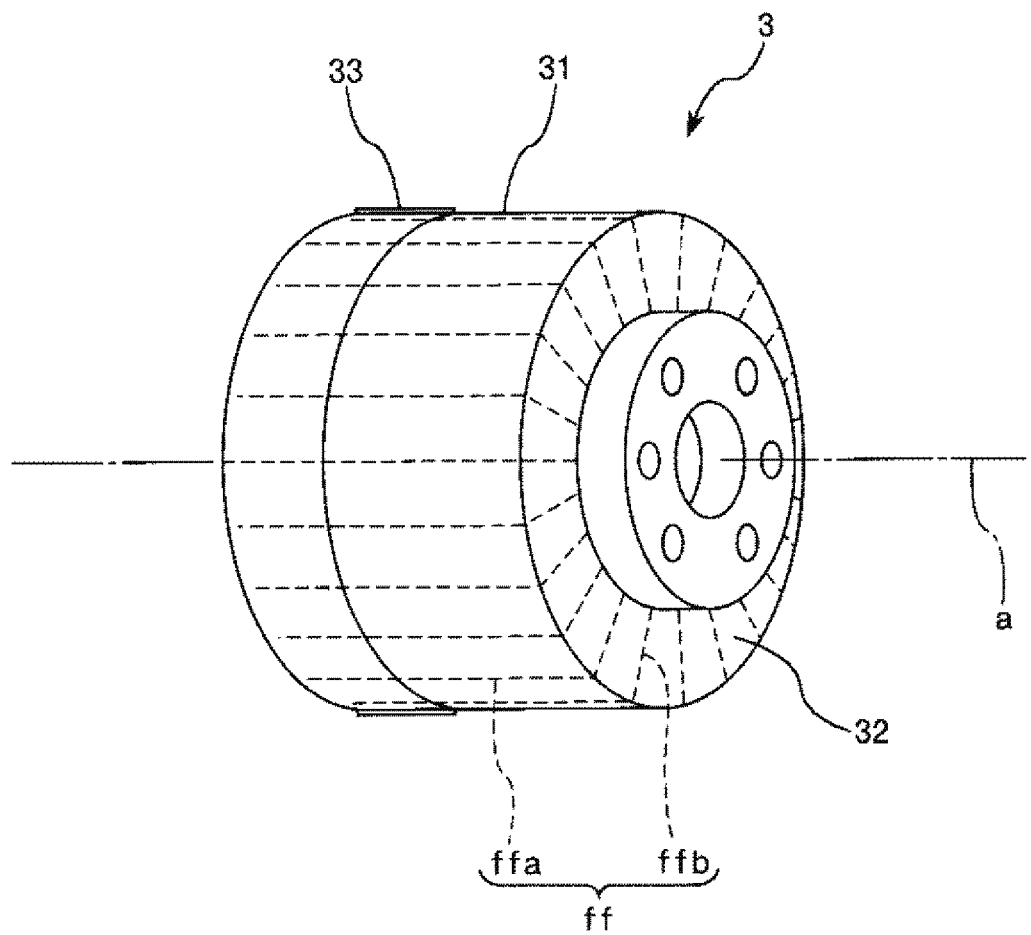
FIG. 5 is a perspective view explaining a metal flow (fiber flow) of a flexible gear included in the gear device illustrated in FIG. 2.

FIG. 2 is an exploded perspective view illustrating the gear device of the first embodiment of the invention. FIG. 3 is a vertical sectional view of the gear device illustrated in FIG. 2. FIG. 4 is a front view of the gear device illustrated in FIG. 2. FIG. 5 is a perspective view explaining a metal flow (fiber flow) of the flexible gear included in the gear device illustrated in FIG. 2. Moreover, in each drawing, for the sake of convenience of description, dimensions of each portion are exaggerated as appropriate as necessary and a dimensional ratio between portions does not necessarily agree with an actual dimensional ratio. In addition, in FIG. 5, for the sake of convenience of description, the illustration of teeth is simplified.

The gear device 1 illustrated in FIGS. 2 to 4 is a wave gear device and, for example, is used as a reduction gear. The gear device 1 has a rigid gear 2 that is an internal gear, a flexible gear 3 that is a cup-shaped external gear disposed on an inside of the rigid gear 2, and a wave generator 4 that is disposed on an inside of the flexible gear 3.

In the gear device 1, a transverse cross section of the flexible gear 3 has a portion that is deformed into an elliptical shape or an oval shape by the wave generator 4 and the flexible gear 3 meshes with the rigid gear 2 at both end portions on a long axis side of the portion. Therefore, the numbers of teeth of the rigid gear 2 and the flexible gear 3 are different from each other.

In such a gear device 1, for example, when the driving force (for example, the driving force from the motor 150 described above) is input into the wave generator 4, the rigid gear 2 and the flexible gear 3 are relatively rotated about an axis a due to a difference in the number of teeth while a meshing position of the gears is moved in a circumferential direction. Therefore, the driving force input from the driving source into the wave generator 4 can be decelerated and can be output from the flexible gear 3. That is, it is possible to realize a reduction gear in which the wave generator 4 is on an input shaft side and the flexible gear 3 is on an output shaft side.

Hereinafter, each portion of the gear device 1 will be sequentially described.

As illustrated in FIGS. 2 to 4, the rigid gear 2 is a gear configured of a rigid body which does not substantially bend in a radial direction and is a ring-shaped internal gear having internal teeth 23. In the embodiment, the rigid gear 2 is a spur gear. That is, internal teeth 23 have a teeth trace parallel to the axis a. Moreover, the tooth trace of the internal teeth 23 may be inclined with respect to the axis a. That is, the rigid gear 2 may be a helical gear or a double helical gear.

The flexible gear 3 is passed through the inside of the rigid gear 2. The flexible gear 3 is a gear having flexibility deformable in the radial direction and is an external gear having external teeth 33 (teeth) which mesh with the internal teeth 23 of the rigid gear 2. In addition, the number of the flexible gear 3 is smaller than the number of the rigid gear 2. As described above, since the numbers of teeth of the flexible gear 3 and the rigid gear 2 are different from each other, it is possible to realize the reduction gear.

In the embodiment, the flexible gear 3 has a cup shape whose one end is opened and the external teeth 33 are formed at an end portion on the opening side. Here, the flexible gear 3 has a cylindrical (more specifically, circular cylindrical shape) body portion 31 (cylindrical portion) around the axis a and a bottom portion 32 connected to one end portion side of the body portion 31 in a direction of the axis a. Therefore, an end portion of the body portion 31 on a side opposite to the bottom portion 32 can be easily deflected in the radial direction. Therefore, it is possible to realize good deflective meshing of the flexible gear 3 with respect to the rigid gear 2. In addition, it is possible to increase rigidity of the end portion of the body portion 31 on the bottom portion 32 side. Therefore, it is possible to stably connect an input shaft and an output shaft to the bottom portion 32.

In addition, as illustrated in FIG. 3, a hole 321 penetrating the bottom portion 32 along the axis a and a plurality of holes 322 penetrating the bottom portion 32 around the hole 321 are formed in the bottom portion 32. A shaft body on the output side can pass through the hole 321. In addition, the holes 322 can be used as screw holes through which screws for fixing the shaft body on the output side to the bottom portion 32 pass. Moreover, these holes may be appropriately provided, or may be omitted.

Such a flexible gear 3 is configured of metal. Therefore, the flexible gear 3 has a metal flow ff in a direction indicated by broken lines in FIG. 5. The metal flow ff has a metal flow ffb radially extending from a center side to an outer peripheral side of the bottom portion 32 in the bottom portion 32 and a metal flow ffa extending from one end portion side to the other end portion side of the body portion 31 in the body portion 31. Moreover, in the specification, the "metal flow" refers to a flow of metal particles or a metal structure, and a forming method is not limited to forging. Particularly, the metal flow formed by forging is referred to as a "fiber flow".

In the embodiment, the metal flow ff takes a shape along a cup shape from the bottom portion 32 side to the body portion 31 side of the flexible gear 3. Therefore, the metal flow ffa included in the body portion 31 is connected to the metal flow ffb included in the bottom portion 32. That is, the metal flow ff continuously extends over the body portion 31 and the bottom portion 32. Moreover, the metal flow ffa may be discontinuous with the metal flow ffb.

In addition, in the embodiment, the metal flow ffb included in the bottom portion 32 linearly extends from the center side to the outer peripheral side of the bottom portion 32. In addition, the metal flow ffa included in the body portion 31 linearly extends in a direction parallel to the axis a. In addition, although not illustrated in FIG. 5, the metal flow ffa included in the body portion 31 has a folded portion when viewed in a cross section along the axis a of the body portion 31 (see folded portions R illustrated in FIG. 11 described below).

As illustrated in FIG. 3, the wave generator 4 is disposed on the inside of the flexible gear 3 and is capable of rotating around the axis a. Therefore, as illustrated in FIG. 4, the wave generator 4 deforms a cross sectional surface of a portion of the flexible gear 3 on a side opposite to the bottom portion 32 to an elliptical shape or an oval shape having a long axis La and a short axis Lb and thereby causes the external teeth 33 to mesh with the internal teeth 23 of the rigid gear 2. Here, the flexible gear 3 and the rigid gear 2 mesh with each other inside and outside to be rotatable around the same axis a.

In the embodiment, the wave generator 4 has a main body portion 41, a shaft portion 42 protruding from the main body portion 41 along the axis a, and a pair of rollers 43 rotatably provided with respect to the main body portion 41 around an axis a1 parallel to the axis a. In such a wave generator 4, the pair of rollers 43 pushes out the flexible gear 3 from the inside while rolling on an inner peripheral surface of the flexible gear 3 and thereby the main body portion 41, the shaft portion 42, and the pair of rollers 43 are rotatable around the axis a. Therefore, for example, when a driving force is input from a driving source into the wave generator 4, the meshing position of the rigid gear 2 and the flexible gear 3 with each other is moved in the circumferential direction.

According to the gear device 1 as described above, the bottom portion 32 of the flexible gear 3 has the metal flow ffb radially extending from the center side to the outer peripheral side of the bottom portion 32. Therefore, the metal flow ffa extending from the bottom portion 32 side to the opening portion side (side opposite to the bottom portion 32) of the body portion 31 can be formed over an entirety in the circumferential direction of the body portion 31. Therefore, it is possible to reduce strength variation in the circumferential direction of the body portion 31 of the flexible gear 3 and, as a result, it is possible to reduce damage of the flexible gear 3.

In the embodiment, the body portion 31 has the metal flow ffa extending from one end portion side to the other end portion side of the body portion 31. Therefore, toughness of the flexible gear 3 in a width direction (radial direction) can be made excellent. In addition, a tensile strength of the flexible gear 3 in the axial direction (direction parallel to the axis a) can also be made excellent. Here, from the viewpoint of effectively reducing the strength variation of the body portion 31 of the flexible gear 3 in the circumferential direction, it is preferable that a density of the metal flow ffa is as uniform as possible over the entirety of the body portion 31 in the circumferential direction.

In addition, the metal flow ffa included in the body portion 31 is connected to the metal flow ffb included in the bottom portion 32. Therefore, strength of a portion (boundary portion) between the bottom portion 32 and the body portion 31 of the flexible gear 3 can be made excellent. Therefore, it is possible to achieve crack prevention, being rigidity improvement, and fatigue strength improvement of an outer periphery portion (corner portion) of the bottom portion 32 of the cup-shaped flexible gear 3, and the like.

The flexible gear 3 having the metal flow ff described above can be manufactured as follows.

Manufacturing Method of Flexible Gear

Hereinafter, a manufacturing method of the flexible gear according to the invention will be described by taking a case where the flexible gear 3 described above is manufactured as an example.

Figure 6:
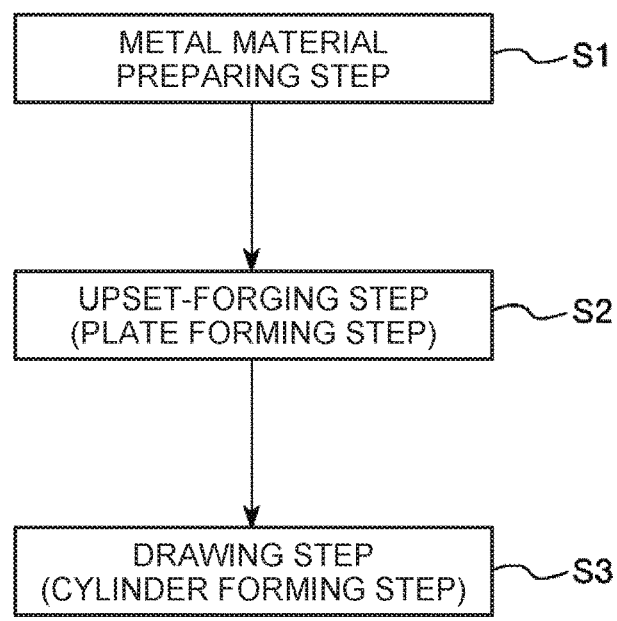
FIG. 6 is a flow chart explaining a manufacturing method of the flexible gear illustrated in FIG. 5.
Figure 7:
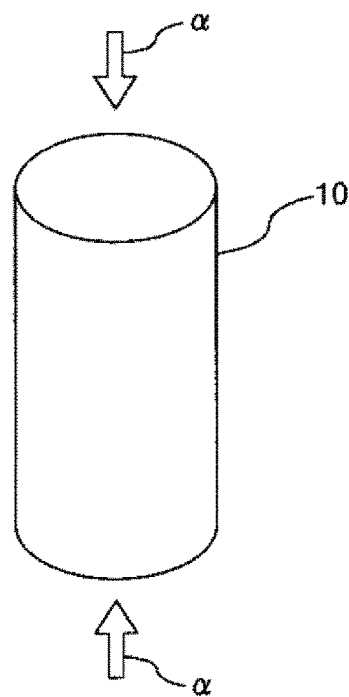
FIG. 7 is a perspective view illustrating a metal material (block body) used in a metal material preparing step illustrated in FIG. 6.
Figure 8:
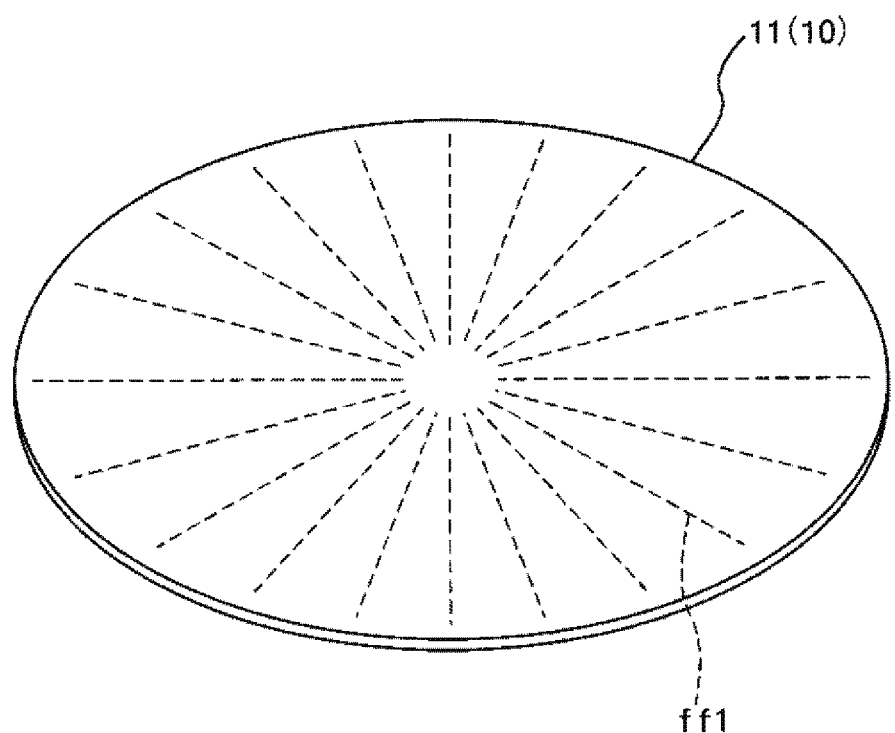
FIG. 8 is a perspective view illustrating a plate body obtained in an upset-forging step illustrated in FIG. 6.
Figure 9:
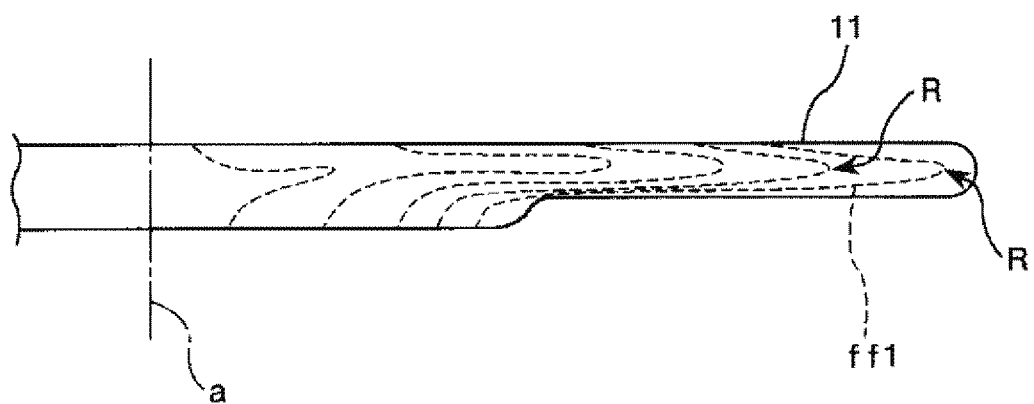
FIG. 9 is a sectional view explaining a metal flow of the plate body illustrated in FIG. 8.
Figure 10:
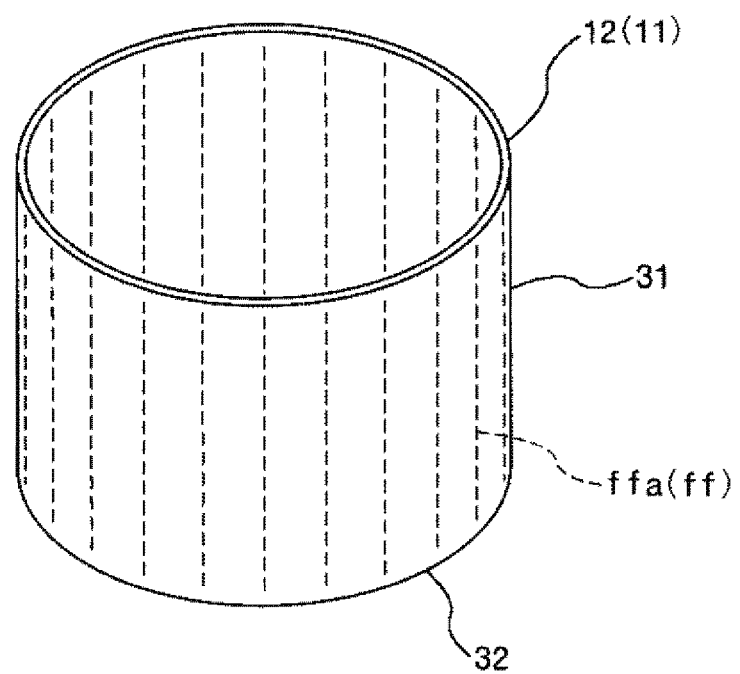
FIG. 10 is a perspective view illustrating a cylindrical body obtained in a drawing step illustrated in FIG. 6.
Figure 11:
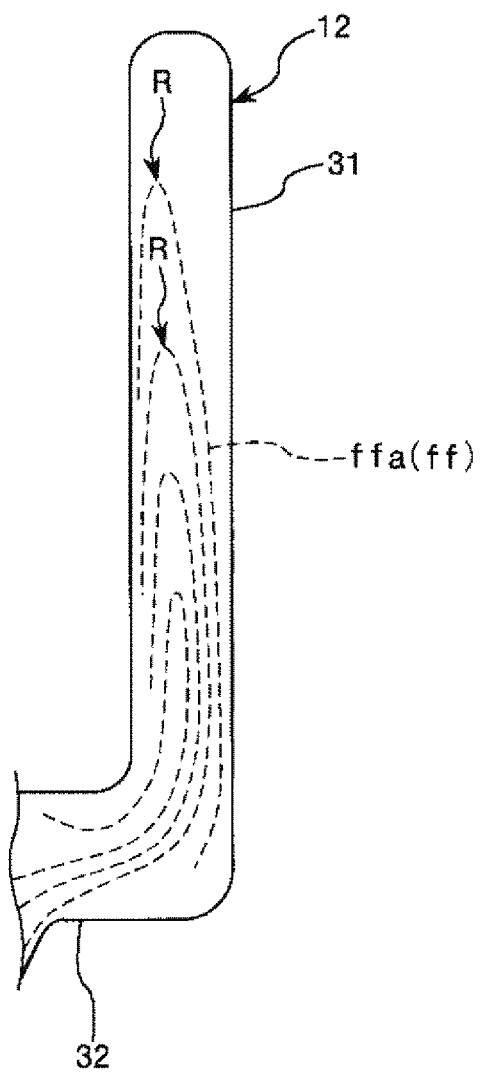
FIG. 11 is a partial sectional view explaining a metal flow of the cylindrical body illustrated in FIG. 10.

FIG. 6 is a flow chart explaining a manufacturing method of the flexible gear illustrated in FIG. 5. FIG. 7 is a perspective view illustrating a metal material (block body) used in the metal material preparing step illustrated in FIG. 6. FIG. 8 is a perspective view illustrating a plate body obtained in an upset-forging step illustrated in FIG. 6. FIG. 9 is a sectional view explaining a metal flow of the plate body illustrated in FIG. 8. FIG. 10 is a perspective view illustrating a cylindrical body obtained in a drawing step illustrated in FIG. 6. FIG. 11 is a partial sectional view explaining a metal flow of the cylindrical body illustrated in FIG. 10.

As illustrated in FIG. 6, the manufacturing method of the flexible gear 3 has [1] a metal material preparing step (step S1), [2] an upset-forging step (step S2), and [3] a drawing step (step S3). Hereinafter, each step will be described in sequence.

[1] Metal Material Preparing Step (Step S1)

First, as illustrated in FIG. 7, a material 10 is prepared. The material 10 is configured of metal. In the embodiment, the material 10 has a cylindrical shape. Therefore, it is possible to make the plate body (plate material) obtained in [2] the upset-forging step described below into a disk shape and to reduce an unnecessary portion of a structure obtained in [3] the drawing step. Moreover, a shape of the material 10 is not limited to the cylindrical shape and, for example, may be a polygonal columnar shape, a cubic shape, a block shape, or the like.

In addition, the configuration material of the material 10 is not particularly limited and various metals can be used. In addition, although the material 10 may or may not have a metal flow, it is preferable that a metal flow, which is formed by a drawing step, is provided in a direction along a pressing direction (direction a illustrated in FIG. 7) in [2] the upset-forging step described below. Therefore, the metal flow (fiber flow) formed in the plate body obtained in [2] the upset-forging step can be easily spread radially from the center side to the outer peripheral side of the plate body. In addition, it is possible to form a metal flow having a high density by forming the folded portion R described below.

[2] Upset-Forging Step (Step S2)

Next, the material 10 is upset-forged. In this case, pressing is performed in the axial direction (direction a illustrated in FIG. 7) of the columnar material 10. Therefore, as illustrated in FIG. 8, a disk-like plate body 11 is formed.

As illustrated in FIG. 8, a metal flow ff1 (fiber flow) radially spreading from the center side to the outer peripheral side of the disk-like plate body 11 is formed in the plate body 11. In addition, as illustrated in FIG. 9, the metal flow ff1 has the folded portions R that are folded so as to cause the outer peripheral side of the plate body 11 to be projected when viewed in a cross section along the axis a (center axis) of the plate body 11.

The upset-forging in this step may be performed either during cold or hot, but it is preferable to carry out hot forging from the viewpoint of workability.

[3] Drawing Step (Step S3)

Next, as illustrated in FIG. 10, the plate body 11 is drawn so as to forma cylindrical body 12 (structure) having the body portion 31 (cylindrical portion) and the bottom portion 32. In this case, as the cylindrical body 12 is formed, the metal flow ff1 of the plate body 11 described above is deformed into the metal flow ff. Therefore, the cylindrical body 12 has the metal flow ff.

Since the metal flow ff of the cylindrical body 12 is formed by the metal flow ff1 of the plate body 11, as illustrated in FIG. 11, the metal flow ffa included in the body portion 31 of the cylindrical body 12 has the folded portions R when viewed in a cross section along the axis a of the body portion 31. Therefore, it is possible to increase the density of the metal flow ff in the body portion 31. As a result, it is possible to improve the toughness of the body portion 31.

The drawing in this step may be performed either during cold or hot, but it is preferable to carryout hot forging from the viewpoint of workability.

The cylindrical body 12 formed as described above is appropriately processed to form the flexible gear 3. For example, after forming the cylindrical body 12, a removing step of an unnecessary portion by cutting or the like, a forming step of the external teeth 33, and the like are performed. Therefore, it is possible to obtain the flexible gear 3 having excellent dimensional accuracy. Moreover, the cylindrical body 12 may be the flexible gear 3. In this case, it may not be necessary to perform processing after forming the cylindrical body 12.

In addition, the method of forming the external teeth 33 after forming the cylindrical body 12 is not particularly limited and, for example, examples thereof include cutting, rolling, and the like, but it is preferable to use rolling. Therefore, the metal flow ff is deformed along the shape of the external teeth 33 and it is possible to reduce discontinuation of the metal flow ff in the external teeth 33. As a result, it is possible to enhance a mechanical strength of the external teeth 33.

As described above, it is possible to form the flexible gear 3. According to the manufacturing method of the flexible gear 3 described above, it is possible to manufacture the flexible gear 3 whose damage can be reduced by having [1] the preparing step of the material 10 composed of metal, [2] the forming step of the plate body 11 by upset-forging of the material 10, and [3] the forming step of the cylindrical body 12 by drawing of the plate body 11.

Second Embodiment

Next, a second embodiment of the invention will be described.

Figure 12:
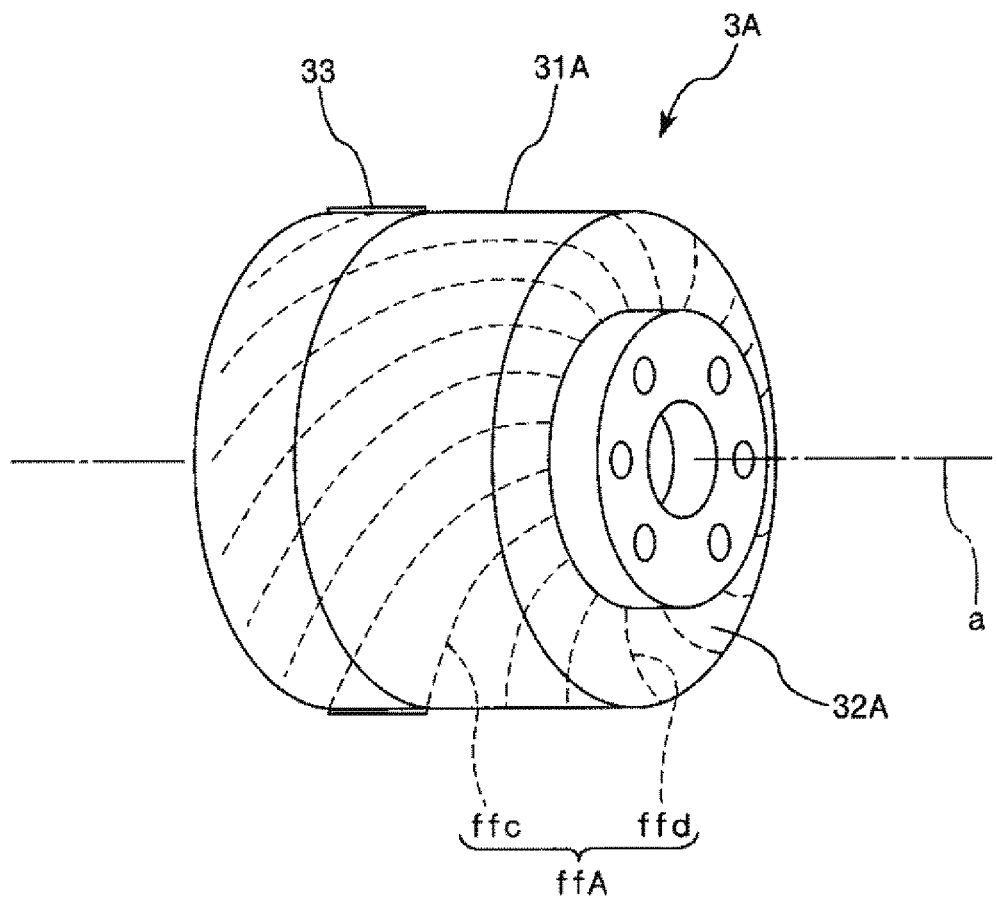
FIG. 12 is a perspective view explaining a metal flow (fiber flow) of the flexible gear included in a gear device according to a second embodiment of the invention.

FIG. 12 is a perspective view explaining a metal flow (fiber flow) of the flexible gear included in a gear device according to a second embodiment of the invention. Moreover, in FIG. 12, for the sake of convenience of description, illustration of teeth is simplified.

The embodiment is similar to the first embodiment described above except that a shape of a metal flow included in the flexible gear is different.

Moreover, in the following description, the embodiment will be described focusing on differences from the embodiment described above and description of similar matters will be omitted. In addition, in FIG. 12, the same reference numerals are given to the same configurations as those in the embodiment described above.

A flexible gear 3A of the embodiment has a cylindrical body portion 31A and a bottom portion 32A connected to one end portion side of the body portion 31A. Therefore, the flexible gear 3A has a metal flow ffA in a direction indicated by broken lines in FIG. 12. The metal flow ffA has a metal flow ffd radially extending from a center side to an outer peripheral side of the bottom portion 32A in the bottom portion 32A and a metal flow ffc extending from one end portion side to the other end portion side of the body portion 31A in the body portion 31A.

In the embodiment, the metal flow ffd included in the bottom portion 32A is curved and extends from a center side to an outer peripheral side of the bottom portion 32A. Therefore, the metal flow ffd included in the bottom portion 32A has a direction component along a circumferential direction of the bottom portion 32A and the direction component extends from the center side to the outer peripheral side of the bottom portion 32A. In addition, the metal flow ffc included in the body portion 31A is curved and extends from a bottom portion 32A side to an external teeth 33 side along a circumferential direction of the body portion 31A. Therefore, the metal flow ffc included in the body portion 31A has the direction component along the circumferential direction of the body portion 31A and the direction component extends from one end portion side to the other end portion side of the body portion 31A.

Here, the metal flow ffd included in the bottom portion 32A is curved and extends from the center side to the outer peripheral side of the bottom portion 32A. Therefore, in a state where the metal flow ffc included in the body portion 31A is continuously connected to the metal flow ffd included in the bottom portion 32A, the metal flow ffc has the direction component along the circumferential direction of the body portion 31A and the direction component can extend from one end portion side to the other end portion side of the body portion 31A.

On the other hand, the external teeth 33 have a tooth trace parallel to the axis a as described above. Therefore, the metal flow ffc included in the body portion 31A extends in a direction intersecting the tooth trace of the flexible gear 3A. Therefore, the strength of the external teeth 33 of the flexible gear 3 can be made excellent.

As described above, the metal flow ffc included in the body portion 31A has the direction component along the circumferential direction of the body portion 31A and extends from one end portion side to the other end portion side of the body portion 31A. Therefore, the metal flow ffc included in the body portion 31A can be extended in direction intersecting the tooth trace of the flexible gear 3A. Moreover, from such a viewpoint, in a case where the tooth trace of the flexible gear 3A is inclined with respect to the axis a, it is preferable that the metal flow ffc is curved or included on a side on which an angle formed by the tooth trace and the metal flow ffc becomes large.

In addition, it is preferable that the metal flow ffc included in the body portion 31A is deformed to undulate along a shape of a tooth surface of the flexible gear 3A, that is, has a portion that is curved along the shape of the tooth surface of the flexible gear 3A. Therefore, the strength of the external teeth 33 of the flexible gear 3A can be made excellent.

The flexible gear 3A described above can be manufactured as follows.

Figure 13:
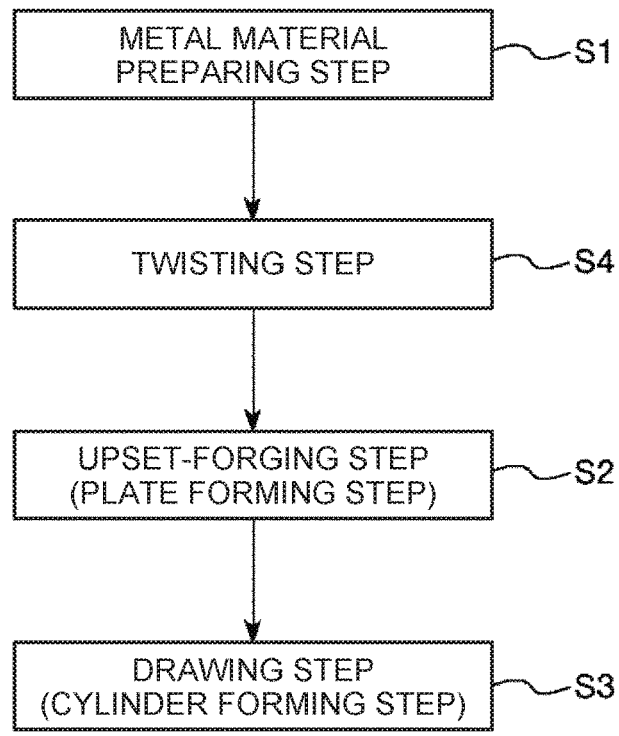
FIG. 13 is a flow chart explaining a manufacturing method of a flexible gear illustrated in FIG. 12.
Figure 14:
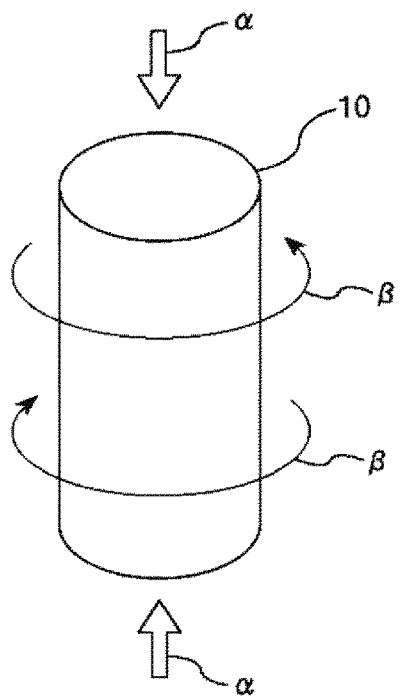
FIG. 14 is a perspective view explaining a twisting step illustrated in FIG. 13.
Figure 15:
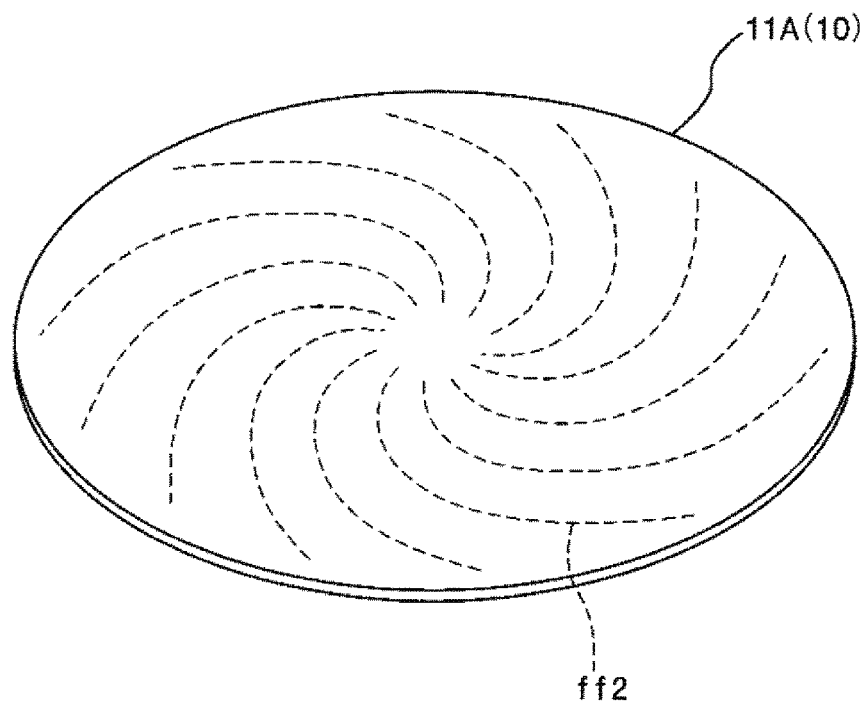
FIG. 15 is a perspective view illustrating a plate body obtained in an upset-forging step illustrated in FIG. 13.
Figure 16:
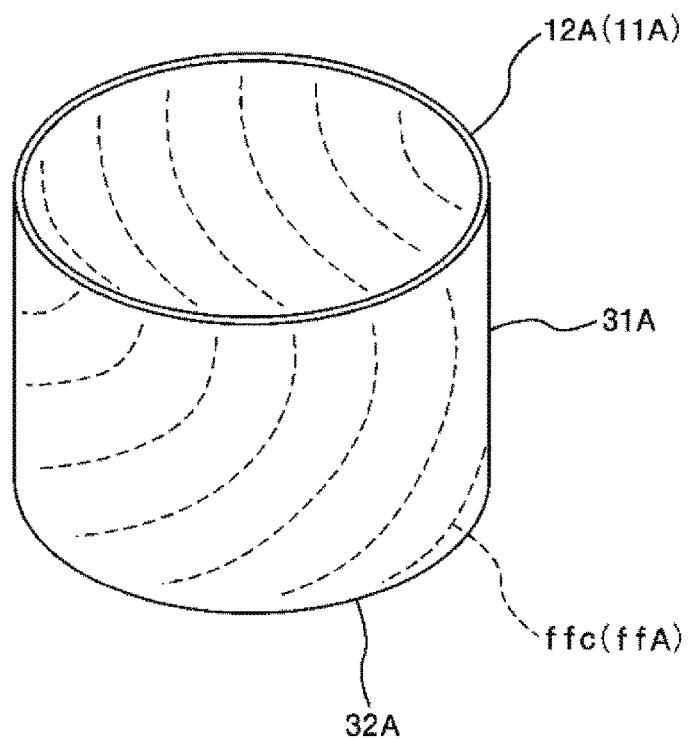
FIG. 16 is a perspective view illustrating a cylindrical body obtained in a drawing step illustrated in FIG. 13.

FIG. 13 is a flow chart explaining a manufacturing method of a flexible gear illustrated in FIG. 12. FIG. 14 is a perspective view explaining a twisting step illustrated in FIG. 13. FIG. 15 is a perspective view illustrating a plate body obtained in an upset-forging step illustrated in FIG. 13. FIG. 16 is a perspective view illustrating a cylindrical body obtained in a drawing step illustrated in FIG. 13.

As illustrated in FIG. 13, the manufacturing method of the flexible gear 3A has [1] a metal material preparing step (step S1), [1A] the twisting step (step S4), [2] the upset-forging step (step S2), and [3] the drawing step (step S3). That is, the manufacturing method of the flexible gear 3A has [1A] the twisting step between [1] the metal material preparing step and [2] the upset-forging step in the manufacturing method of the flexible gear 3 of the first embodiment described above.

In [1A] the twisting step, the material 10 is twisted. In this case, rotational forces are applied in directions opposite to each other (directions β illustrated in FIG. 14) around an axis at both end portions of the columnar material 10. The twisting may be performed either during cold or hot. In addition, after a long bar material is twisted, the bar material is cut to a necessary length and the material 10 after twisting may be obtained. In this case, it is possible to efficiently produce a large number of the materials 10 after the twisting.

Thereafter, [2] the upset-forging step is performed to form a plate body 11A. As illustrated in FIG. 15, a metal flow ff2 (fiber flow) curved and radially spread from the center side to the outer peripheral side of the disk-like plate body 11A is formed in the plate body 11A. Moreover, [2] the upset-forging step may be performed at the same time or overlapping with [1A] the twisting step described above.

Next, [3] the drawing step is performed to form a cylindrical body 12A (structure) having the body portion 31A (cylindrical portion) and the bottom portion 32A. In this case, as the cylindrical body 12A is formed, the metal flow ff2 of the plate body 11A described above is deformed into a metal flow ffA. Therefore, the cylindrical body 12A has the metal flow ffA.

In addition, as a forming method of the external teeth 33 after forming the cylindrical body 12A, when rolling is used, the metal flow ffA is formed into a shape deformed along a shape (shape of a tooth surface) of the external teeth 33 and a mechanical strength of the external teeth 33 can be made particularly excellent.

Third Embodiment

Next, a third embodiment of the invention will be described.

Figure 17:
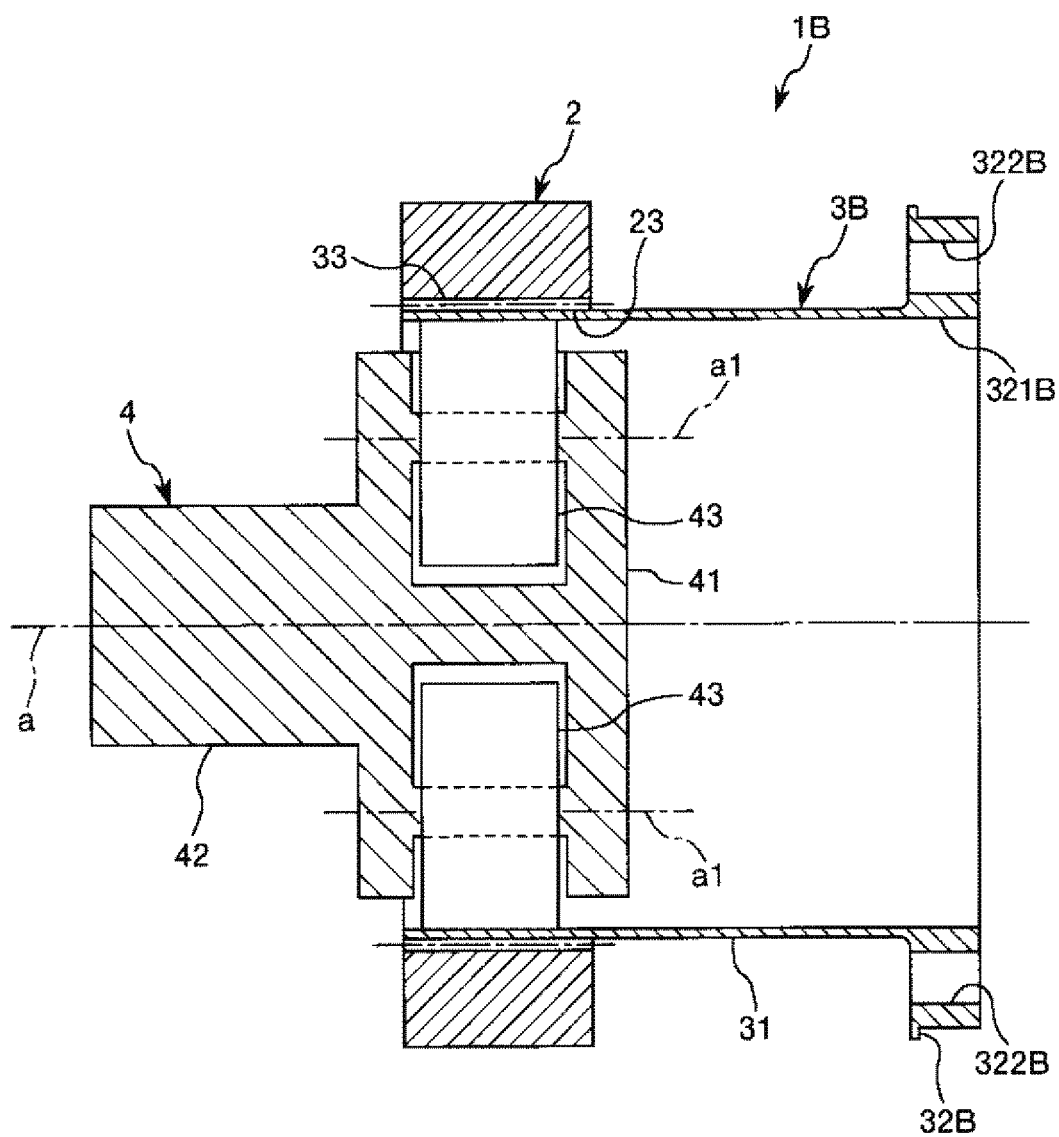
FIG. 17 is a vertical sectional view illustrating a gear device according to a third embodiment of the invention.
Figure 18:
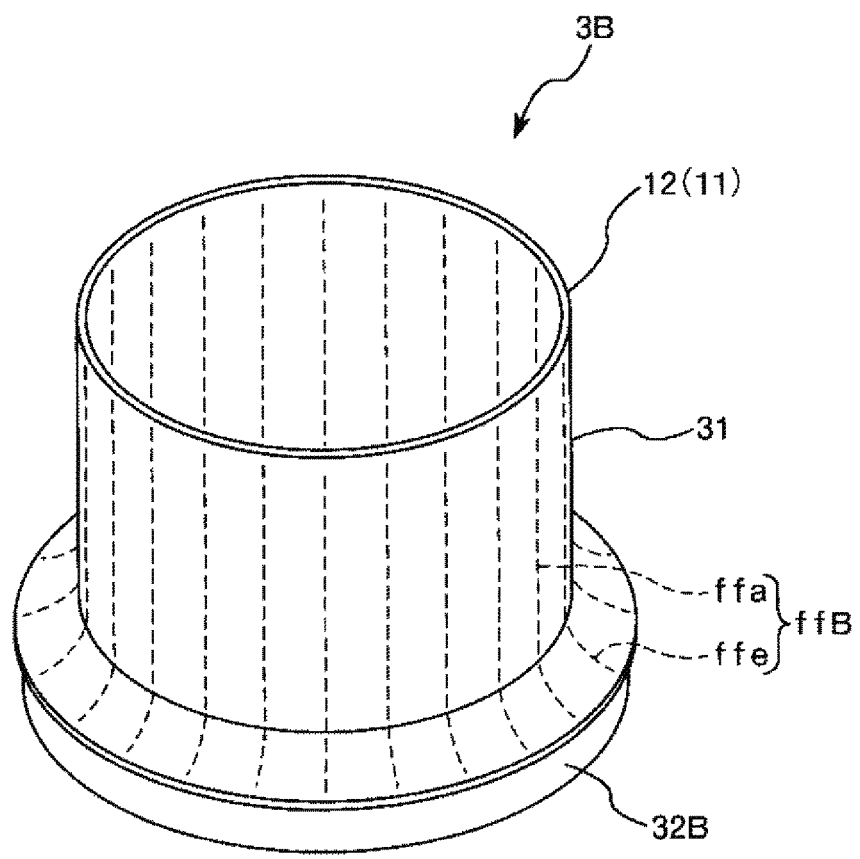
FIG. 18 is a perspective view explaining a metal flow (fiber flow) of a flexible gear included in the gear device illustrated in FIG. 17.

FIG. 17 is a vertical sectional view illustrating a gear device according to the third embodiment of the invention. FIG. 18 is a perspective view explaining a metal flow (fiber flow) of a flexible gear included in the gear device illustrated in FIG. 17. Moreover, in FIG. 18, for the sake of convenience of description, illustration of teeth is omitted.

Moreover, in the following description, the embodiment will be described focusing on differences from the embodiments described above and description of similar matters will be omitted.

A gear device 1B illustrated in FIG. 17 has a flexible gear 3B that is a hat-shaped external gear disposed on an inside of a rigid gear 2.

The flexible gear 3B has a flange portion 32B that is connected to one end portion of a cylindrical body portion 31 and protrudes on a side opposite to an axis a. A plurality of holes 322B penetrating along the axis a are formed in the flange portion 32B. The holes 322B can be used as screw holes through which screws for fixing a shaft body on the output side to the flange portion 32B pass. In addition, a shaft body on the output side can pass through an inner periphery portion 321B of the flange portion 32B.

Such a flexible gear 3B has a metal flow ffB in a direction indicated by broken lines in FIG. 18. The metal flow ffB has a metal flow ffe radially extending from an inner peripheral side to an outer peripheral side of the flange portion 32B in the flange portion 32B and a metal flow ffa extending from one end portion side to the other end portion side of the body portion 31 in the body portion 31. Such a metal flow ffe is provided and thereby it is possible to form the metal flow ffa extending from a flange portion 32B side to an opening portion side (side opposite to the flange portion 32B) of the body portion 31 over an entirety of the body portion 31 in a circumferential direction. Therefore, it is possible to reduce strength variation in the circumferential direction of the body portion 31 of the flexible gear 3B and, as a result, it is possible to reduce damage of the flexible gear 3B.

Similar to the flexible gear 3 of the first embodiment described above, the flexible gear 3B having the configuration described above can also be manufactured by forming the cylindrical body by drawing after upset-forging a metal material, and processing if necessary. In this case, for example, drawing may be performed so that the outer periphery portion of the plate body obtained by upset-forging becomes the flange portion 32B. In this case, for example, it is preferable that a center portion of the plate body is removed before the drawing.

Above, although the robot, the flexible gear, the gear device, and the manufacturing method of a flexible gear according to the invention are described based on the illustrated embodiments, the invention is not limited to the embodiments and the configuration of each portion can be replaced with an arbitrary configuration having the same function. In addition, any other configurations may be added to the invention. In addition, each embodiment may be appropriately combined.

In addition, in the manufacturing method of a flexible gear according to the invention, an arbitrary process may be added.

In the embodiments described above, the gear device, in which the base included in the robot is the "first member", the first arm is the "second member", and the driving force is transmitted from the first member to the second member, is described, but the invention is not limited to the embodiments. The invention may also be applied a gear device in which an n-th (n is an integer of 1 or more) arm is a "first member", an n+1-th arm is a "second member", and a driving force is transmitted from one of the n-th arm and the n+1-th arm to the other. In addition, the invention may also be applied to a gear device that transmits a driving force from a second member to a first member.

In addition, in the embodiments described above, the six-axis vertical multi-articulated robot is described, but the invention is not limited to the embodiments as long as a gear device having a flexible gear is used. For example, the number of joints of the robot is arbitrary and it is also applicable to a horizontal multi-articulated robot.

The entire disclosure of Japanese Patent Application No. 2016-063183, filed Mar. 28, 2016 is expressly incorporated by reference herein.

What is claimed is:
1. A robot comprising:
a first member;
a second member that is configured to include an arm and is rotatably provided with respect to the first member; and
a gear device that transmits a driving force from one of the first member and the second member to the other of the first member and the second member, the gear device having a flexible gear, the flexible gear being configured with:
  a cylindrical body having a first end and a second end opposite to each other along an axis of the cylindrical body; and
  a bottom plate located at the first end of the cylindrical body,
wherein the bottom plate has a metal flow, and the metal flow in the bottom plate extends from a center of the bottom plate to the cylindrical body, and
the cylindrical body has the metal flow, and the metal flow in the cylindrical body extends from the first end toward the second end, is folded back along a direction of a thickness of the cylindrical body at a folded position located in the cylindrical body, and continuously extends toward the first end from the folded position.

2. The robot according to claim 1,
wherein the metal flow in the bottom plate radially extends from the center of the bottom plate to the cylindrical body.

3. The robot according to claim 1,
wherein the metal flow in the cylindrical body extends in a direction intersecting a tooth trace of the flexible gear.

4. The robot according to claim 1,
wherein the metal flow in the cylindrical body has a direction component along a circumferential direction of the cylindrical body and extends from the first end to the second end of the cylindrical body.

5. The robot according to claim 1,
wherein the metal flow in the cylindrical body has a bending portion along a shape of a tooth surface of the flexible gear when viewed in a cross section intersecting the axis of the cylindrical body.

6. The robot according to claim 1,
wherein the metal flow in the cylindrical body continuously extends from the metal flow in the bottom plate.

7. The robot according to claim 1,
wherein the metal flow in the bottom plate curves and extends from the center of the bottom plate to the cylindrical body.

8. A robot comprising:
a first member;
a second member that is configured to include an arm and is rotatably provided with respect to the first member; and
a gear device that transmits a driving force from one of the first member and the second member to the other of the first member and the second member, the gear device having a flexible gear, the flexible gear being configured with:
a cylindrical body having a first end and a second end opposite to each other along an axis of the cylindrical body; and
a flange located at the first end of the cylindrical body,
wherein the flange has a metal flow, and the metal flow in the flange extends from an inner periphery of the flange located at the first end of the cylindrical body to an outer periphery of the flange, and
the cylindrical body has the metal flow, and the metal flow in the cylindrical body extends from the first end toward the second end, is folded back along a direction of a thickness of the cylindrical body at a folded position located in the cylindrical body, and continuously extends toward the first end from the folded position.

9. A flexible gear comprising:
a cylindrical body having a first end and a second end opposite to each other along an axis of the cylindrical body; and
a bottom plate located at the first end of the cylindrical body,
wherein the bottom plate has a metal flow, and the metal flow in the bottom plate radially extends from a center of the bottom plate to the cylindrical body, and
the cylindrical body has the metal flow, and the metal flow in the cylindrical body extends from the first end toward the second end, is folded back along a direction of a thickness of the cylindrical body at a folded position located in the cylindrical body, and continuously extends toward the first end from the folded position.

10. A gear device comprising:
the flexible gear according to claim 9.

* * * * *